(12) United States Patent
Ahuja et al.

(10) Patent No.: US 6,427,040 B1
(45) Date of Patent: Jul. 30, 2002

(54) OPTICAL WAVEGUIDE GRATINGS DEVICE WITH ADJUSTABLE OPTICAL SPACE PROFILE

(75) Inventors: Ashish Ahuja, Paramus; Benjamin John Eggleton, Summit; Torben N. Nielson, Monmouth Beach; John A. Rogers, New Providence, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/533,412

(22) Filed: Mar. 22, 2000

Related U.S. Application Data (63) Continuation-in-part of application No. 09/183,048, filed on Oct. 30, 1998.

(51) Int. Cl.[7] .................................................. G02B 6/34
(52) U.S. Cl. .......................................... 385/37; 385/10
(58) Field of Search ....................................... 385/10, 37

(56) References Cited

U.S. PATENT DOCUMENTS 5,757,540 A * 5/1998 Judkins et al. .............. 359/341
6,011,886 A * 1/2000 Abramov et al. .............. 385/37
6,097,862 A * 8/2000 Abramov et al. .............. 385/37

OTHER PUBLICATIONS

Ferdinand, Pierre; Magne, Sylvain; Martinez, Christopher; Roussel, Nicholas, "Measurement of Index Modulation Along Fiber Bragg Gratings by Side Scattering and Local Heating Techniques", *Optical Fiber Technology* 5, pp. 119–132, (1999).

* cited by examiner

*Primary Examiner*—Akm E. Ullah
*Assistant Examiner*—Jennifer Doan
(74) *Attorney, Agent, or Firm*—Lowenstein Sandler PC (57) ABSTRACT

In accordance with the invention, an optical waveguide grating with an adjustable optical spacing profile comprises a waveguide grating in thermal contact with one or more resistive film coatings. A coating extends along the length of the grating and its local resistance varies along the length of the grating. In one embodiment, a plurality of overlapping coatings are chosen so the resistance variation of each is different, thereby permitting a variety of heat generation profiles to be effected by independent control of the coatings. The different heat generation profiles, in turn, proportionately change the grating geometric spacing and local refractive index along the grating length, providing the desired adjustable optical spacing profile. Other embodiments use resistive films with abruptly changing or periodically changing heating variation.

11 Claims, 8 Drawing Sheets

OPTICAL WAVEGUIDE GRATINGS DEVICE WITH ADJUSTABLE OPTICAL SPACE PROFILE

CROSS-REFERENCE TO RELATED APPLICATIONS

This application is a continuation-in-part of U.S. patent application Ser. No. 09/183,048 filed by B. Eggleton et al. on Oct. 30, 1998 and entitled "Optical Grating Devices With Adjustable Chirp."

FIELD OF THE INVENTION

The present invention relates to optical waveguide grating devices and, in particular, to a waveguide grating device wherein the optical pathlength between successive grating elements (hereinafter "optical spacing") can be adjusted with distance and time.

BACKGROUND OF THE INVENTION

Optical waveguide gratings with adjustable optical spacing profiles are potentially valuable components in optical communication systems. Waveguide Bragg gratings can provide wavelength-dependent dispersion compensation. If the Bragg grating optical spacing is adjustable with distance and time, the grating can dynamically respond to changing spectral profiles of needed dispersion compensation. Long-period waveguide gratings can provide wavelength-dependent loss. If the long-period grating spacing is adjustable, the grating can dynamically respond to changing profiles of needed loss. Such adjustable gratings are of particular importance for contemplated broad band WDM systems where dynamic dispersion and amplitude compensation will be required.

An optical communication system comprises, in essence, a source of information-carrying optical signals, a length of optical waveguide for carrying the optical signals and a receiver for detecting the optical signals and demodulating the information they carry. Optical amplifiers are typically located along the waveguide at regular intervals, and add/drop nodes are disposed at suitable locations for adding and dropping signal channels. Conventional systems are usually based on high purity silica optical fiber waveguide and erbium-doped optical fiber amplifiers (EDFAs). Such systems introduce small differences in the propagation time and transmitted power of different wavelength signal components. For example longer wavelength components are subject to slightly longer delay than shorter wavelength components (chromatic dispersion) and wavelength components off the amplification peak of EDFAs will be transmitted with slightly less power. These phenomena can distort a transmitted pulse and limit bandwidth and/or transmission distance.

The performance of high speed WDM systems will depend on the ability of the system to compensate dispersion and wavelength dependent power fluctuations. Moreover in high speed systems, dynamic fluctuations within the system will change the spectral profile of required dispersion and power compensation as a function of time, making it very difficult to provide needed compensation with static devices.

A typical Bragg grating comprises a length of optical waveguide, such as optical fiber, including a plurality of perturbations in the index of refraction substantially equally spaced along the waveguide length. These perturbations selectively reflect light of wavelength X equal to twice the spacing Λ between successive perturbations times the effective refractive index, i.e. $\lambda = 2 n_{eff} \Lambda$, where $\lambda$ is the vacuum wavelength and $n_{eff}$ is the effective refractive index of the propagating mode. The remaining wavelengths pass essentially unimpeded. If the geometric spacing between successive perturbations changes as a function of distance into the grating (the grating is "chirped") different wavelengths will travel different distances into the grating before they are reflected. Thus chirped gratings provide different propagation delays to different wavelengths, and their geometric spacings can be chosen to compensate the components of a dispersed signal, i.e. the spacing can be chosen so that all spectral components receive the same total delay (See F. Ouellette, "Dispersion cancellation using linearly chirped Bragg filters in optical waveguides", 12 *Optics Letters* 847–849 (1987)).

A typical long-period grating couples optical power between two copropagating modes with very low back reflections. It comprises a length of optical waveguide wherein a plurality of refractive index perturbations are spaced along the waveguide by a periodic distance Λ' which is large compared to the wavelength λ of the transmitted light. In contrast with conventional Bragg gratings, long-period gratings use a periodic geometric spacing Λ' which is typically at least 10 times larger than the transmitted wavelength, i.e. $\Lambda' \geq 10\lambda$. Typically Λ' is in the range 15–1500 micrometers, and the width of a perturbation is in the range 1/5 Λ' to 4/5 Λ'. In some applications, such as chirped gratings, the spacing Λ' can vary along the length of the grating. Long-period gratings are particularly useful for equalizing amplifier gain at different wavelengths of an optical communications system. See, for example, U.S. Pat. No. 5,430,817 issued to A. M. Vengsarkar on Jul. 4, 1995, which is incorporated herein by reference.

A shortcoming of waveguide gratings as dispersion and power spectrum compensation devices is that they are permanent and narrow band. The spacing between successive perturbations is fixed in manufacture, fixing the compensating characteristics of the grating. High speed systems, however, require dynamic compensation.

One approach to providing waveguide gratings capable of dynamic compensation is to provide a plurality of electrical heaters along the length of the grating. Each heater is independently controlled to adjust the portion of the grating local to the heater by heating the waveguide material. Such heating thermally expands the material to change the geometric spacing between perturbations and also changes the index of refraction. It thus changes the optical path length between perturbations. The difficulty with this approach is that it requires many tiny heaters and many tiny connections and controls. Failure of any one heater connection along the sequence can be serious.

Another approach is set forth in copending application Ser. No. 09/183,048 filed by B. J. Eggleton et al. on Oct. 30, 1998 and entitled "Optical Grating Devices With Adjustable Chirp", which is incorporated herein by reference. Here the grating is provided with a film of linearly varying electrical resistance. Application of a current to the film generates a linearly varying amount of heat along the length of the grating. A second uniform resistance film may be separately controlled to vary the average heat generated. This approach works well in simple systems where the needed compensation is of a known spectral slope. But because the heat generation is monotonic with distance, the device does not adjust well to systems where even the spectral slope of needed compensation can change. Accordingly there is a need for improved optical waveguide grating device wherein the optical pathlength between successive grating elements can be adjusted with distance and time.

SUMMARY OF THE INVENTION

In accordance with the invention, an optical waveguide grating with an adjustable optical spacing profile comprises a waveguide grating in thermal contact with one or more resistive film coatings. A coating extends along the length of the grating and its local resistance varies along the length of the grating. In one embodiment, a plurality of overlaping coatings are chosen so the resistance variation of each is different, thereby permitting a variety of heat generation profiles to be effected by independent control of the coatings. The different heat generation profiles, in turn, proportionately change the grating geometric spacing and local refractive index along the grating length, providing the desired adjustable optical spacing profile. Other embodiments use resistive films with abruptly changing or periodically changing heating variation.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for purposes of illustrating the concepts of the invention and are not to scale.

DETAILED DESCRIPTION

This disclosure is divided into four parts. Part I describes waveguide grating devices having multilayer heating films permitting control of heat generating profiles. Part II describes a device having an abruptly changing heating film to provide tunable phase shifting. Part III describes a device with a heating film to form a tunable superstructure grating, and Part IV describes a preferred application for gratings in accordance with the invention.

Figure 1A:
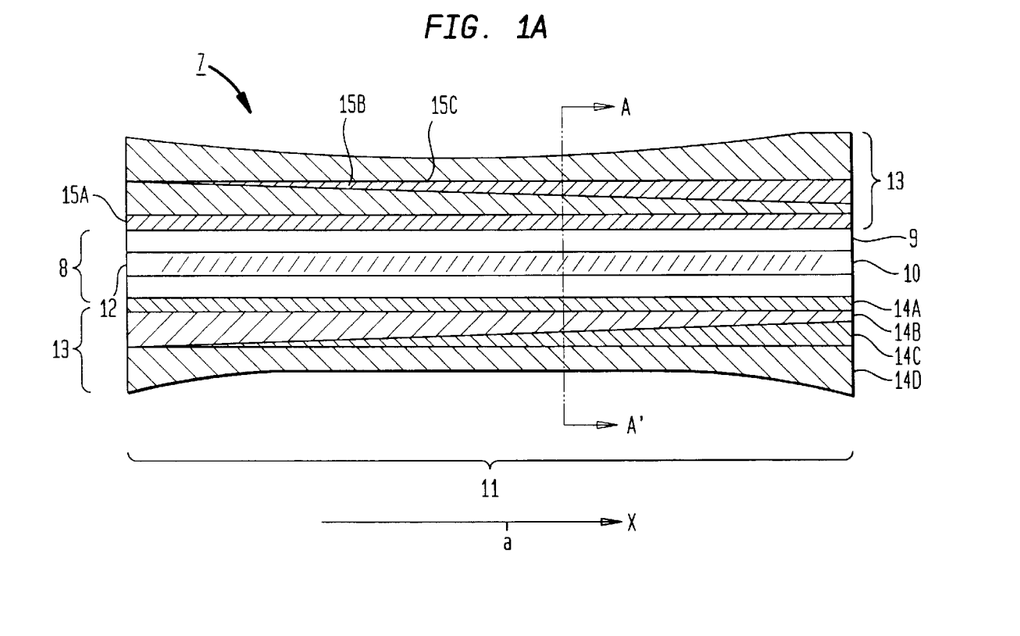
FIGS. 1A and 1B are schematic longitudinal and axial cross sections of an exemplary waveguide grating device with an adjustable optical spacing profile.

I. Grating Devices with Multilayer Heating Films Permitting Control of Heat Generating Profiles Referring to the drawings, FIG. 1A is a schematic longitudinal cross section of an exemplary waveguide grating device 7 with a heating profile that is adjustable in both time and in space along the grating x direction. The device 7 comprises a length of optical waveguide 8 (here optical fiber) comprising a cladding 9 and a core 10 including an optical grating 11. The grating comprises a sequence of refractive index perturbations 12. The grating 11 is thermally coupled to a multilayer heater 13 comprising a plurality of layers of resistive film 14A, 14B, 14C and 14D. The resistive films are separated by thin insulating layers 15A, 15B, 15C and are connected to respective power sources (not shown) for independently passing electrical current through each film along the length of the grating 11.

Figure 1B:
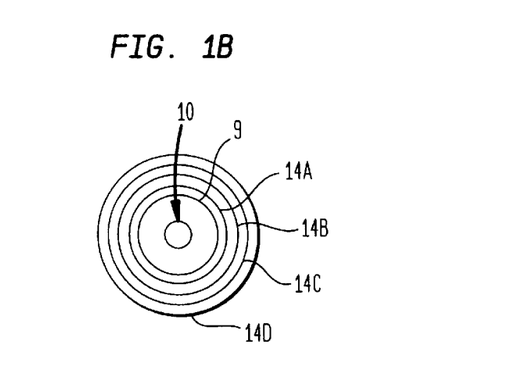
Figure 2:
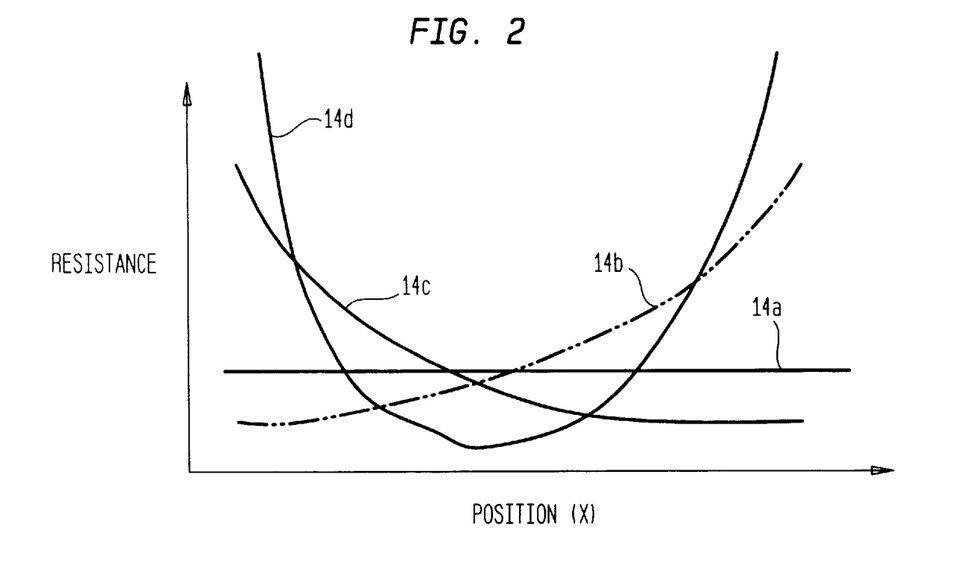
FIG. 2 is a schematic graphical illustration of the resistance profiles of the resistive film coatings in the device of FIGS. 1A and 1B.

FIG. 1B shows the axial cross section along the line A–A'. Each resistive film 14A, 14B, 14C, 14D is characterized by a resistance which is a function of the distance x along the grating. Preferably the resistance of each film varies as a different function of x so that a wide variety of heating profiles along x can be generated by independent control of the current applied to each film. For example, film 14A can be of constant resistance (e.g. constant thickness), film 14B can be of increasing resistance (linearly decreasing thickness), film 14C can be of decreasing resistance (linearly increasing thickness) and film 14D can have a resistance which decreases quadratic with distance away from the grating center, a (e.g. the thickness is $1/(x-a)^2$). FIG. 2 graphically illustrates the variation in local resistance of each film as a function of x.

With this arrangement, the local heat generated is approximately the summation of the local heat generated by the four films, and the expansion of the optical pathlength between grating perturbations is approximately proportional to the local temperature. Since the four films provide heat generating profiles that are constant, proportional to ±x and proportional to $(x-a)^2$, respectively, a wide variety of optical spacing profiles can be approximated by supplying different relative levels of power to the different films.

More generally, the temperature in the core of the fiber to a good approximation can be written as the linear combination of the temperature profiles $$T(x) = \Sigma T_n(x)$$

where $T_n(x)$ is the temperature profile induced by the nth film. In the case of the ultra thin films, $(\Delta\tau(x) \ll d)$ ... where d is the fiber radius, the local temperature is given by: $\Delta T_n(x) = 1/t_n(x)$.

In the most general case an arbitrary temperature profile can be obtained using a sum of orthogonal functions. An appropriate basis set can be found in any mathematical handbook. As an example, consider a Taylor series expansion, which is simply expanding in terms of polynomials, i.e.

$$T(x) = \sum \frac{f'(0)x^n}{n!}$$

In the case of FIGS. 1A and 1B, the series of films would be as follows: a) uniform film to provide DC offset; b) tapered film, with +1/x variation to provide positive chirp; c) tapered film, with −1/x thickness variation to provide negative chirp; d) a film with a $1/(x-a)^2$ thickness variation. The concept could be extended to e) $1/x^3$, etc. Alternatively, the thickness can be varied to provide a plurality of Fourier components.

The resistive films of controlled thickness along x can be made in a variety of ways. Films which extend peripherally around the fiber waveguide (as shown in FIGS. 1A and 1B) can be electroplated while the fiber is pulled at a fixed or variable rate from the bath to produce a coating whose thickness varies along the length of the grating. The preferred resistive films are silver. The electroplating of variable thickness silver films on fibers is described in detail in the aforementioned Eggleton et al. application Ser. No. 09/183,048.

The resistive films need not extend entirely around the periphery of the fiber (or planar waveguide) and each film can be formed with a controlled variable thickness along the grating by disposing the fiber in position for receiving coating metal from a metal source and depositing metal on the fiber while moving a shadow mask between the fiber and the source to provide patterning of the deposited metal on the fiber. Coating of variable thickness metal films on fibers by shadow masking is described in detail in copending U.S. application Ser. No. 09/252,704 filed by B. J. Eggleton et al. on Feb. 18, 1999 and entitled "Method for Making Optical Fiber Devices Having Variable Thickness Metal Coatings", which is incorporated herein by reference.

Figure 3A:
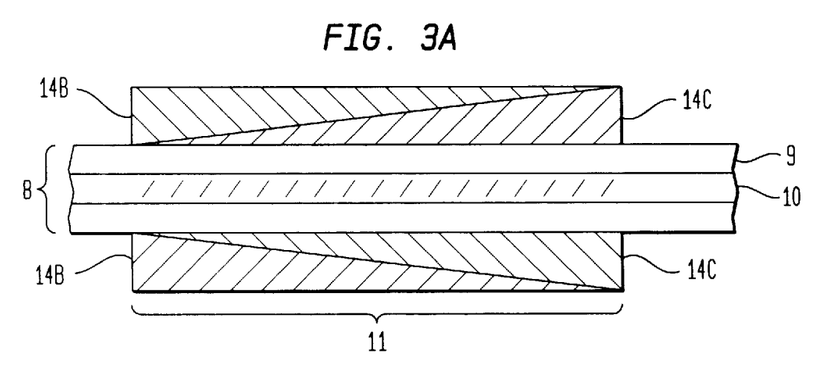
FIGS. 3A and 3B are schematic views of a second embodiment of a waveguide grating with an adjustable optical spacing profile.

FIG. 3A illustrates a simplified form of the FIG. 1 device wherein the constant resistance film 14A and the quadratic resistance film 14D have been omitted. The films 14B and 14C exhibit resistance profiles proportional to x and −x, respectively.

Figure 3B:
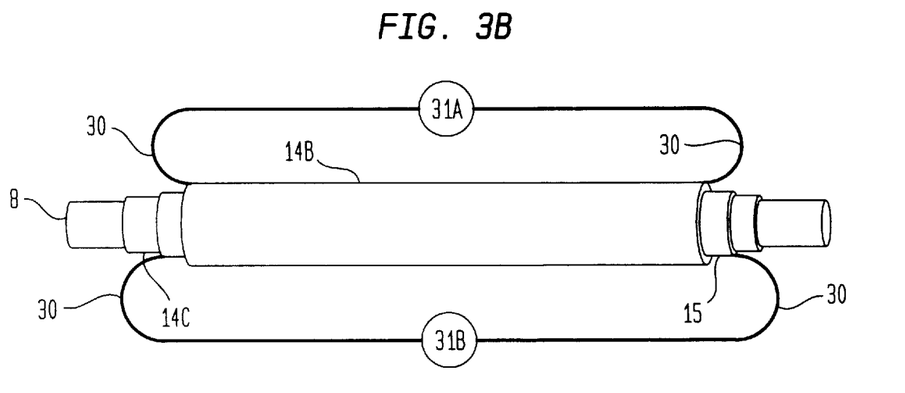

FIG. 3B is a perspective view of the FIG. 3A device showing the leads 30 for interconnection with independent power supplies 31A and 31B. This device is particularly useful in dispersion compensation, as chirp spacings can be induced for both positive slope dispersion compensation and negative slope dispersion compensation.

Figure 4A:
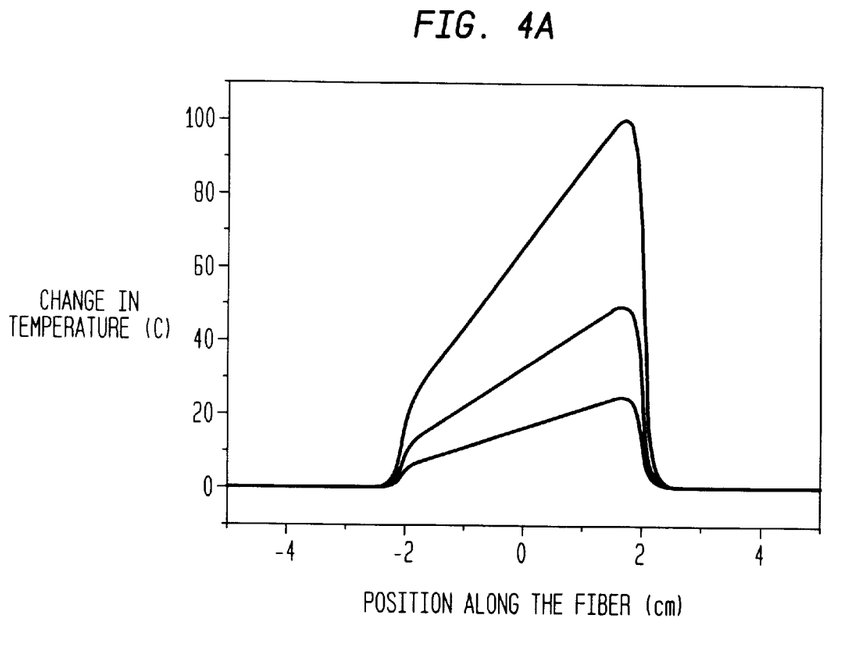
FIGS. 4A, 4B, 4C and 4D are graphical illustrations of temperature profiles which can be achieved by the device of FIGS. 3A and 3B.
Figure 4B:
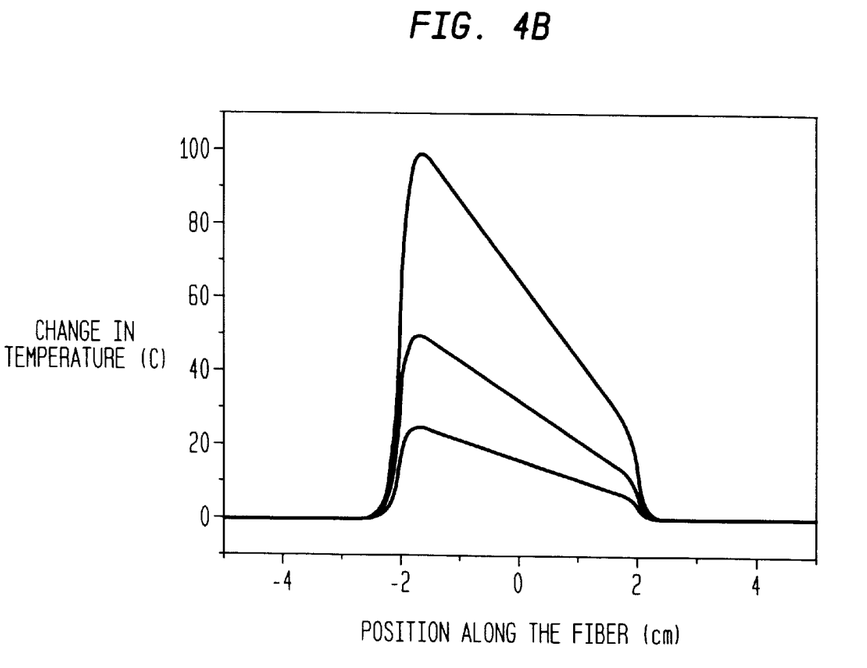
Figure 4C:
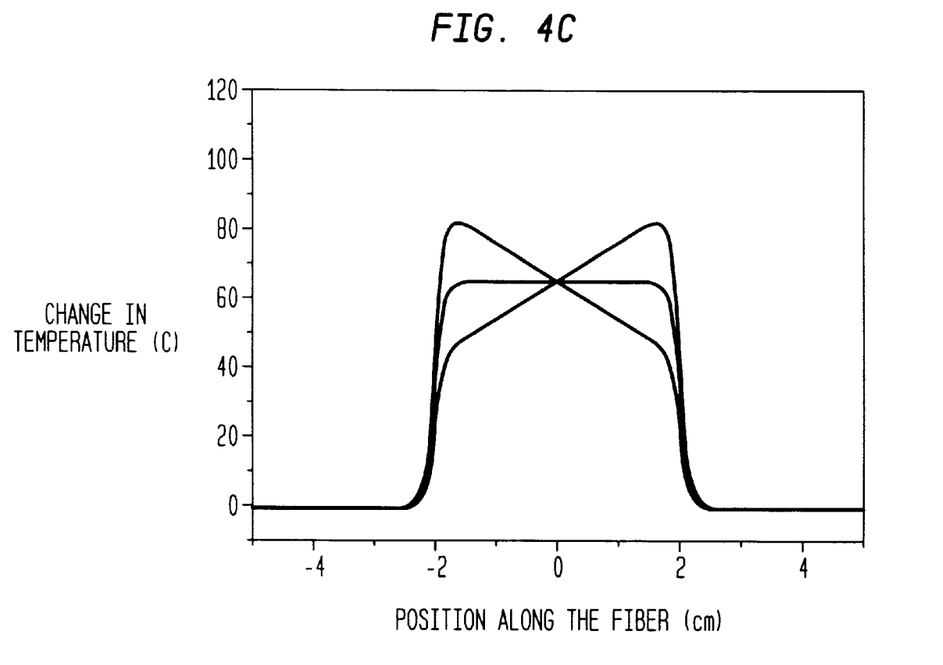
Figure 4D:
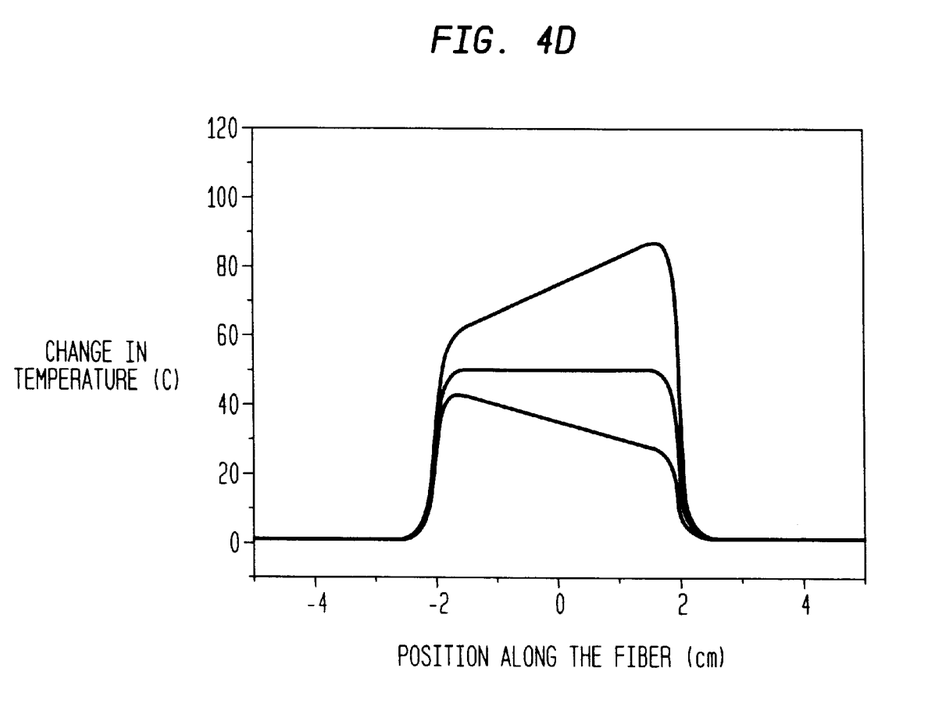

FIGS. 4A–4D are graphical illustrations of temperature profiles which can be achieved in the device of FIGS. 3A and 3B. FIG. 4A shows the change in temperature as a function of distance from the grating center for three different levels of power to film 14B. FIG. 4B shows the temperature profile for three different levels of power to film 14C. FIG. 4C shows three profiles which can be achieved by coordinated levels of power to both films 14B and 14C. FIG. 4D shows three additional profiles achievable by coordinated levels of power to both films.

II. Tunable Phase Shifted Grating Devices

Figure 5:
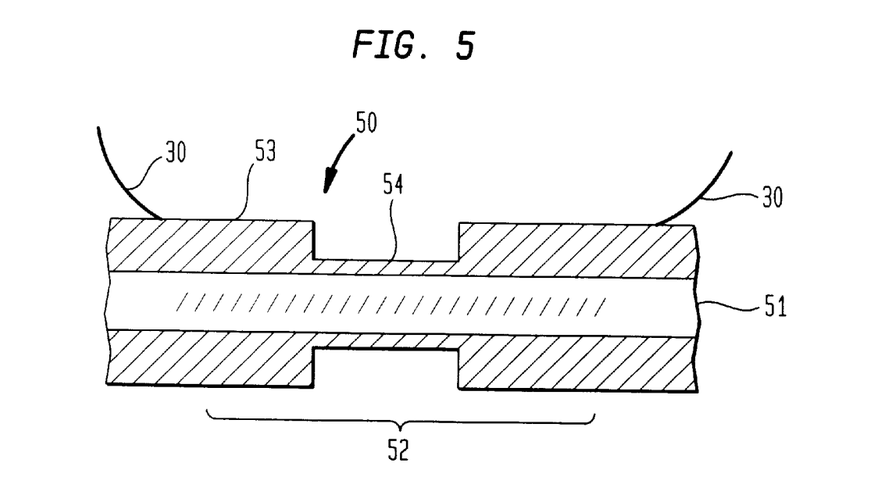
FIG. 5 illustrates a tunable phase shifted fiber grating.

FIG. 5 illustrates a tunable phase-shifted fiber Bragg grating 50 comprising a length of fiber 51 containing a grating 52 and a heating film 53 having an abrupt high resistance region 54 at an interior region of the grating 52.

The FIG. 5 device can be fabricated by depositing a first thin uniform film (typically 400 angstroms thick) along the length of grating 52 using an e-beam evaporation. A small amplitude mask (typically 3 mm long) can then be placed over region 54 between the grating and the evaporator, and a thicker second film (typically 1 micrometer) can be deposited in contact with the first film on either side of the mask. This produces a composite film 53 comprising two thick (lower resistance) segments on both sides of a thin (high resistance) region 54.

In operation, current through the composite film heats the thin interior region 54 to a much higher temperature than the rest of the grating. This introduces a phase shift between the two sections of the grating. The magnitude of the phase shift is a function of the temperature change and thus the applied voltage. The phase shift manifests in a narrow resonance in the reflection spectrum.

In an alternative embodiment, two thin (higher resistance) segments can be disposed on both sides of a thick (lower resistance) region.

Figure 6A:
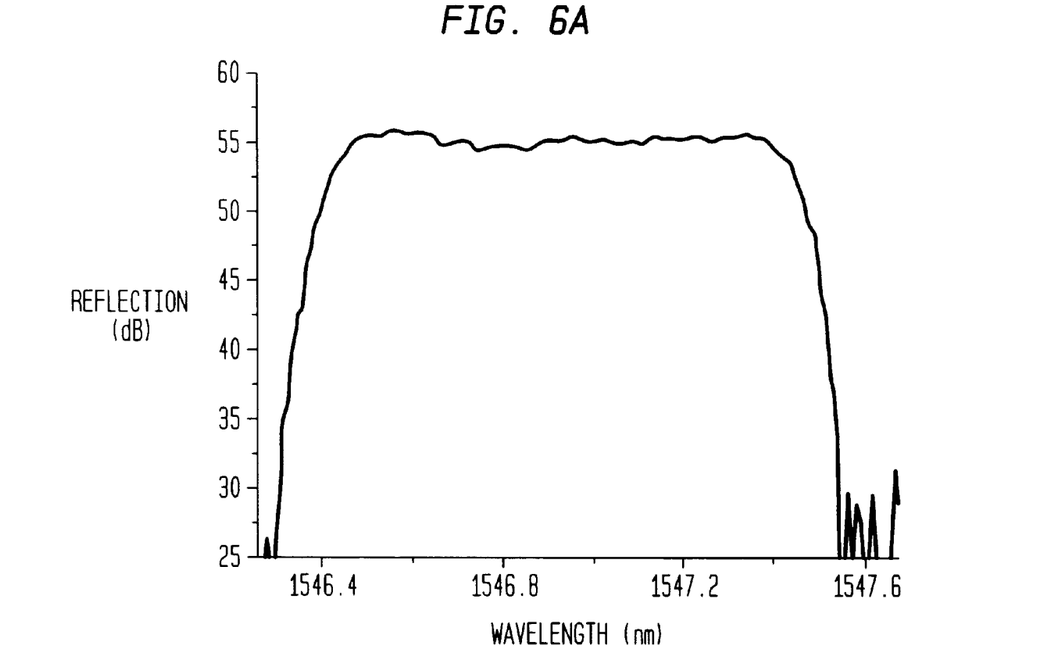
FIGS. 6A and 6B are graphical illustrations showing typical reflection spectra for the FIG. 5 device.

FIG. 6A is a reflection spectrum of a typical conventional Bragg grating without phase tuning. There are no significant resonances within the broad reflection band.

Figure 6B:
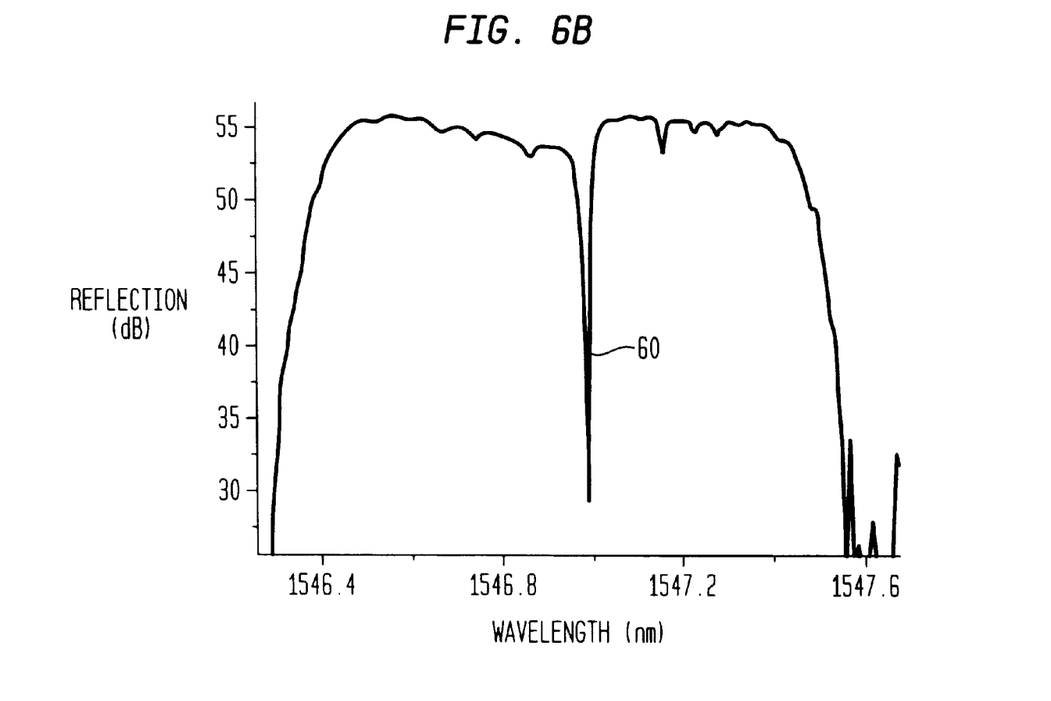

FIG. 6B is a reflection spectrum of a typical Bragg grating according to FIG. 5. It includes a phase shift induced resonance 60. The reflectivity and spectral position of the resonance 60 can be controlled by the voltage applied to the heating film 53. Such characteristics have important applications in fiber lasers, fiber sensing devices and filtering.

III. Tunable Superstructure Gratings

A superstructure grating is one wherein the grating is subject to an additional periodic variation in a parameter such as period or refractive index. The variation has a period which is large compared to the grating geometric spacing. Conventional superstructure gratings are not tunable.

Figure 7:
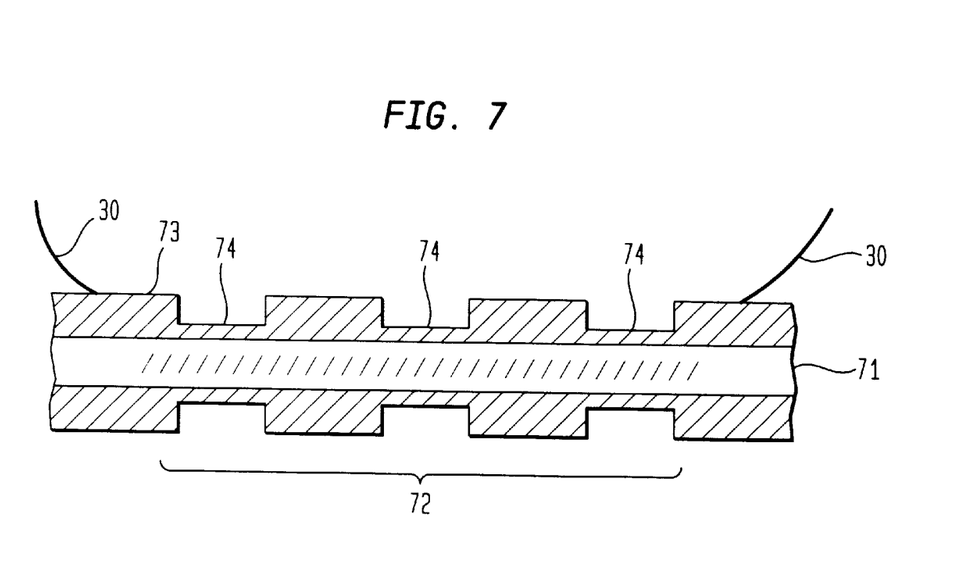
FIG. 7 illustrates a tunable superstructure grating.

FIG. 7 illustrates a tunable superstructure fiber grating 70 comprising a length of fiber 71 containing a grating 72 and a heating film 73 having a periodic sequence of high resistance regions 74.

The FIG. 7 device can be fabricated by depositing a first thin uniform resistive film along the length of the grating. A second film is then deposited through a periodic amplitude mask. The resulting composite film thickness varies periodically along the length of the grating. A representative device can have a period of 1.5 mm with a duty cycle of 33%. The ratio of film thickness can be 50:1.

In operation, the application of current to the resistive film produces a periodic heat distribution which is much larger than the geometric spacing of the grating. This superlattice of periodic structures gives rise to sideband reflection lobes whose strength is dependent on the thermal gradient between the relative heated and unheated parts of the grating. The spectral position of the lobes is dependent on the period of the heating film.

Figure 8A:
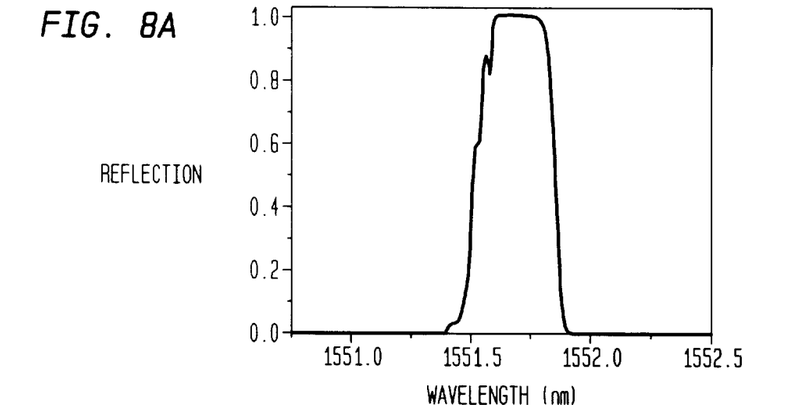
FIGS. 8A, 8B and 8C illustrate typical reflection spectra of the FIG. 7 device.
Figure 8B:
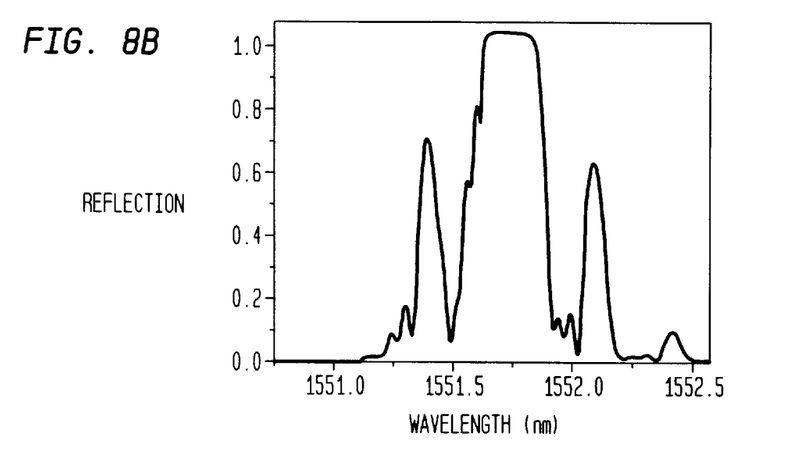
Figure 8C:
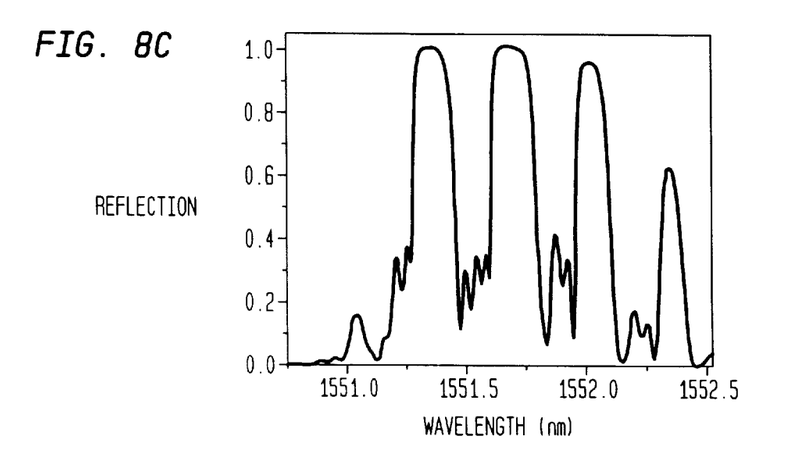

FIGS. 8A, 8B and 8C are graphical illustrations of the reflection spectrum of such a tunable superstructure grating. FIG. 8A shows the spectrum with no voltage applied to the film. FIG. 8B shows the spectrum with 5 volts applied and FIG. 8C shows the effect of 10 volts. As can be seen, the reflectivity of the side lobes can be dynamically adjusted by varying the applied voltage. Such devices are useful in WDM lightwave systems to permit tunable reflectivity for equally spaced sidebands.

IV. Preferred Applications of the Tunable Gratings

Figure 9:
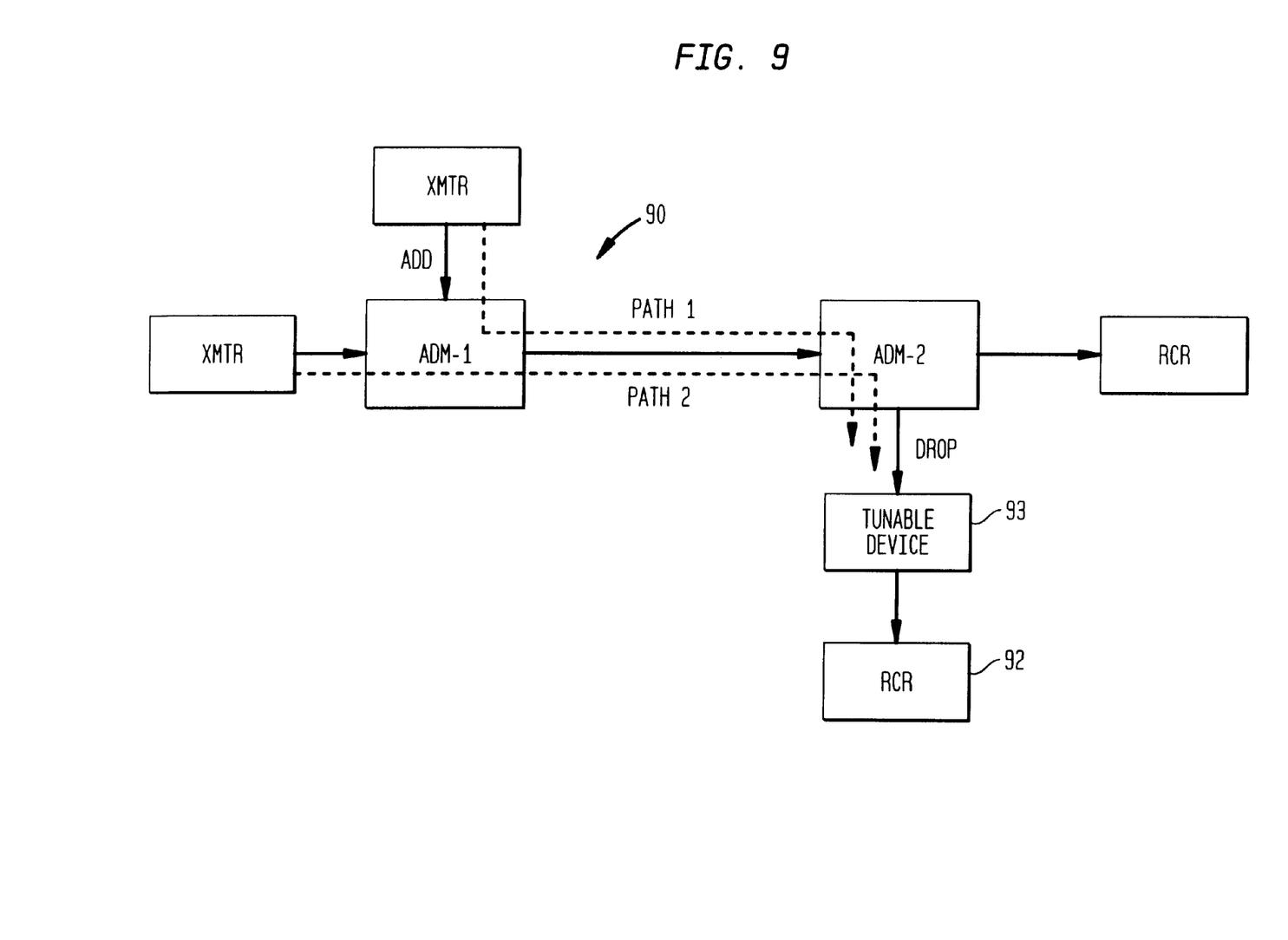
FIG. 9 is a schematic diagram of a portion of an optical network useful in understanding a preferred application of the inventive device.

A preferred network application of the tunable grating devices disclosed herein is to adjust a signal for path dependent amplitude and phase distortion. FIG. 9 is a schematic diagram of a portion of a network 90 having a pair of add/drop modules designated ADM-1 and ADM-2, including a receiver 92 at the drop output of ADM-2. A tunable grating device 93 for reasons to be explained, is advantageously disposed between the drop output of ADM-2 and the receiver 92.

In networks incorporating add/drop modules, a wavelength channel may reach the receiver via different paths. Consider, for example, a channel added at ADM-1, and received at the drop port of ADM-2. We can designate this as path 1. The total amplitude distortion and phase distortion incurred in path 1 is predominately the sum of the distortions of ADM-1 in its add configuration and ADM-2 in its drop configuration. But the same wavelength channel could also reach the receiver via a second path, path 2, where the distortions would be the sum of the distortions of ADM-1 in its through configuration and ADM-2 in its drop configuration. The distortions for these two different paths would in general be different, and device 7 can be tuned differently for each scenario to permit optimum recovery of the signal in each case.

A second preferred application of the tunable grating devices disclosed herein is compensation of dispersion and dispersion slope. Dispersion slope is the wavelength dependence of the dispersion. Dispersion slope is inherent in all fibers and can limit systems performance. In particular in multi-wavelength systems (WDM) different channels acquire different amounts of dispersion, and thus need different amounts of dispersion compensation. This is usually accomplished using specialty fibers that have prescribed dispersions and/or optical components fibers have a given dispersion slope. At these lower bitrates the dispersion within a channel is still to a very good approximation constant.

At very high bitrates (>40 Gbit/s) dispersion slope manifests within the channel bandwidth. This is because the channel occupies enough bandwidth such that the dispersion varies even over the narrow wavelength range of the single channel. Dispersion slope in this context manifests in pulse distortion, in particular pulse asymmetry and ultimately inter-symbol interference. Thus there is a need for dispersion compensation devices that can provide dispersion slope for a single-channel. Desirably the device should be adjustable such that the dispersion and dispersion slope can be optimized independently to allow for minimum bit-error rate.

The tunable gratings of the invention can provide such independent control of dispersion and dispersion slope. A first film that varies inversely with position can provide a tunable level of dispersion and one or more additional films providing tunable nonlinear chirp can permit tuning the dispersion slope.

It is to be understood that the above-described embodiments are. illustrative of only a few of the many possible specific embodiments which can represent applications of the principles of the invention. Numerous and varied other arrangements can be readily devised by those skilled in the art without departing from the spirit and scope of the invention.

What is claimed is:

1. An adjustable optical waveguide grating device comprising:
    a length of optical waveguide including an optical grating comprising a plurality of spaced refractive index perturbations; and
    a plurality of electrically resistive films in thermal contact with the waveguide each extending along the optical grating, at least two said resistive films exhibiting different resistance versus length profiles and connected to separately controllable sources of electrical power, whereby the heat versus length profile along the grating can be adjusted to vary the optical pathlength between successive perturbations along the length of the grating.

2. An adjustable grating device according to claim 1 wherein the optical grating is a Bragg grating.

3. An adjustable grating device according to claim 1 wherein the optical grating is a long period grating.

4. An adjustable grating device according to claim 1 wherein a first of said plurality of resistive films has a resistance profile which varies inversely with distance along the grating.

5. An adjustable grating device according to claim 4 wherein a second of said plurality of resistive films has a resistance profile which varies inversely with distance in the opposite direction from the first film.

6. An adjustable grating device according to claim 5 wherein a third of said resistive films has a resistance profile which varies inversely as the square of distance from a point along said grating.

7. An adjustable grating device according to claim 6 further comprising a resistive film having a resistance profile which is constant with length.

8. An adjustable grating according to claim 7 wherein the resistive film having a constant resistance profile is less than the length of the grating.

9. An adjustable grating according to claim 1 wherein the plurality of resistive films have resistance versus length profiles which form a basis set of profiles, whereby control of the electrical power applied to the respective films generates a superimposed approximation of an arbitrary heat versus length profile along the grating.

10. An adjustable optical waveguide grating device comprising:
    a length of optical waveguide including an optical grating comprising a plurality of spaced refractive index perturbations; and
    a resistive film in thermal contact with the waveguide, the film comprising a region of a first resistance disposed between a pair of regions of a second resistance, the first resistance higher than the second resistance, said film connected to a controllable source of electrical power, whereby a tunable phase shift can be introduced in the waveguide between said pair of regions.

11. An adjustable optical waveguide grating device comprising:
    a length of optical waveguide including an optical grating comprising a plurality of refractive index perturbations spaced apart by a first periodic spacing; and
    a resistive film in thermal contact with the waveguide, the film comprising a plurality of regions of a first resistance and a plurality of regions having resistance larger than the first resistance spaced along the film at a second periodic spacing which is larger than the first periodic spacing,
    said resistive film connected to a controllable source of electrical power, whereby the resistive film produces a periodic heat distribution in which the periodic variation is larger than the spacing of the grating.

* * * * *